US005270754A

United States Patent [19]

Newman

[11] Patent Number: 5,270,754
[45] Date of Patent: Dec. 14, 1993

[54] VIEWFINDER LENS MOUNT FOR COMPACT CAMERA WITH FLIP-UP FLASH/VIEWFINDER UNIT

[75] Inventor: Peter A. Newman, Rochester, N.Y.

[73] Assignee: Eastman Kodak Company, Rochester, N.Y.

[21] Appl. No.: 946,198

[22] Filed: Sep. 17, 1992

[51] Int. Cl.⁵ .............................................. G03B 15/03
[52] U.S. Cl. .................................................. 354/149.11
[58] Field of Search .................................. 354/149.11

[56] References Cited

U.S. PATENT DOCUMENTS

| | | | |
|---|---|---|---|
| 4,350,420 | 9/1982 | Engelsmann et al. | 354/145 |
| 4,983,999 | 1/1991 | Meisezahl et al. | 354/149.11 |
| 4,996,548 | 2/1991 | Schappler et al. | 354/149.11 |
| 5,005,032 | 4/1991 | Burnham | 354/149.11 |
| 5,146,252 | 9/1992 | Burnham | 354/149.11 |

*Primary Examiner*—Michael L. Gellner
*Assistant Examiner*—Nicholas J. Tuccillo
*Attorney, Agent, or Firm*—Roger A. Fields

[57] ABSTRACT

A compact camera comprises a flash unit adapted to be flipped up from a camera body for use and flipped down towards the camera body for storage and having a viewfinder opening for viewing a subject to be photographed, and an elongate resiliently flexible supporting part for the flash unit constrained to be flexed longitudinally in opposite directions when the flash unit is flipped up and down to operate as an overcenter spring for urging the flash unit alternatively to flip up or down and having a viewfinder opening arranged to be located behind the viewfinder opening of the flash unit when the flash unit is flipped up. According to the invention, a non-flexible lens element is connected to the flexible supporting part over its viewfinder opening but only at in-line points spaced apart laterally across the supporting part, as opposed to longitudinally along the supporting part, to prevent the lens element from interfering with flexing of the supporting part longitudinally.

2 Claims, 3 Drawing Sheets

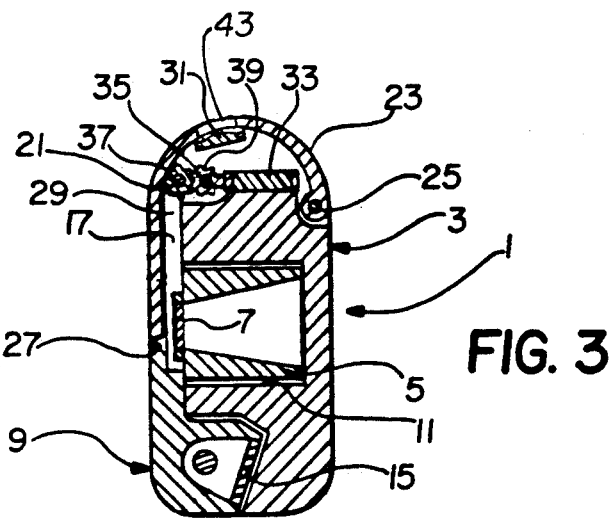
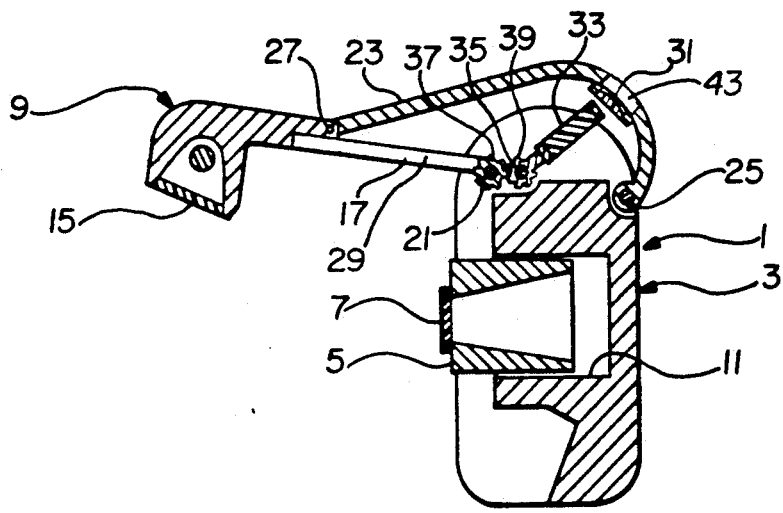
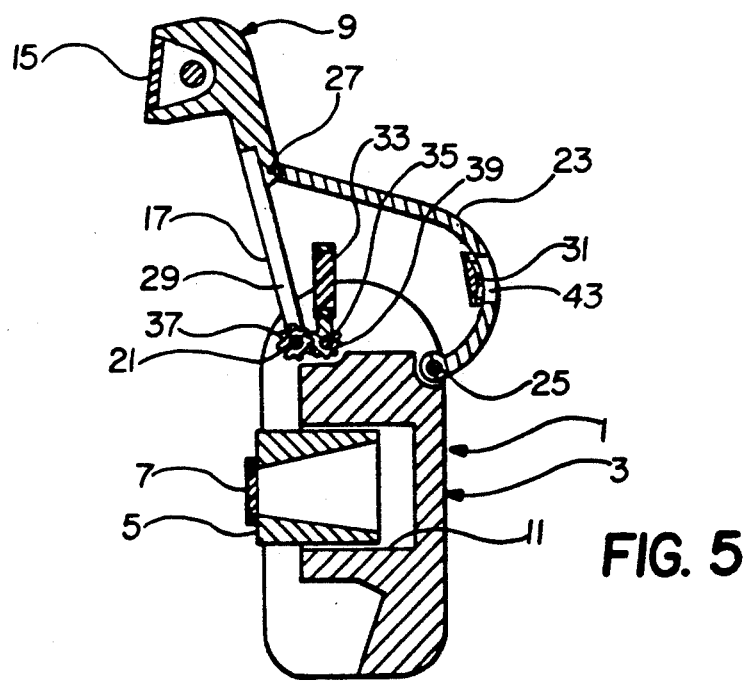

VIEWFINDER LENS MOUNT FOR COMPACT CAMERA WITH FLIP-UP FLASH/VIEWFINDER UNIT

BACKGROUND OF THE INVENTION

1. Field of the Invention

The invention relates generally to the field of photography, and in particular to a viewfinder lens mount for a compact folding camera with a flip-up flash/viewfinder unit.

2. Description of the Prior Art

Commonly assigned U.S. Pat. No. 4,983,999, issued Jan. 8, 1991, discloses a compact folding camera with a flip-up flash unit. The flip-up flash unit includes a head part having a flash emission window, a neck part integrally formed with the head part, and a separate supporting part. The neck part and the supporting part are pivotally connected to the camera body to permit the flash unit to be flipped down against the camera body to a folded storage position and to be flipped up from the camera body to a non-folded use position. In the storage position, the head part and the neck and supporting parts cover respective portions of the camera body. Conversely, in the use position, the head part and the neck and supporting parts are elevated from the camera body with the flash emission window facing a subject to be photographed and with the supporting part located behind the neck part to brace or support the neck part. Respective viewfinder openings for viewing the subject are arranged in the neck and supporting parts to be optically aligned when the flash unit is in its use position. The supporting part is resiliently flexible and is pivotally connected to the neck part, besides being pivotally connected to the camera body, to be constrained to be flexed along its length in opposite directions when the unit is flipped up or down to operate as an overcenter spring for urging the flash unit alternatively to the storage and use positions.

PROBLEM TO BE SOLVED BY THE INVENTION

If a viewfinder lens element is fixedly mounted within the viewfinder opening in the supporting part of the flip-up flash unit as suggested in commonly assigned U.S. Pat. No. 5,005,032, issued Apr. 2, 1991, then the natural stiffness of the lens element will tend to obstruct or interfere with flexing of the supporting part longitudinally when it operates as an overcenter spring. Consequently, the supporting part will be stressed and probably may fail.

SUMMARY OF THE INVENTION

A compact camera comprising a flash unit adapted to be flipped up from a camera body for use and flipped down towards the camera body for storage and having a viewfinder opening for viewing a subject to be photographed, and an elongate resiliently flexible supporting part for the flash unit constrained to be flexed longitudinally in opposite directions when the flash unit is flipped up and down to operate as an overcenter spring for urging the flash unit alternatively to flip up or down and having a viewfinder opening arranged to be located behind the viewfinder opening of the flash unit when the flash unit is flipped up, is characterized by:

a non-flexible viewfinder lens element; and securement means connecting the non-flexible lens element to the flexible supporting part over its viewfinder opening but only at in-line points spaced apart laterally across the supporting part, as opposed to longitudinally along the supporting part, to prevent the lens element from interfering with flexing of the supporting part longitudinally.

BRIEF DESCRIPTION OF THE DRAWINGS

FIGS. 3, 4 and 5 are side elevation section views of the compact camera, showing progressive movement of the flash unit from its storage position to its use position;

DETAILED DESCRIPTION OF THE PREFERRED EMBODIMENT

The invention is described as being embodied in a compact folding 35 mm camera with a built-in flash unit. Because such photographic cameras have become well known as typified by U.S. Pat. No. 4,983,999 and No. 5,005,032, this description is directed in particular to camera elements forming part of or cooperating directly with the preferred embodiment. It is to be understood, however, that camera elements not specifically shown or described may take various forms known to persons of ordinary skill in the art.

Figure 1:
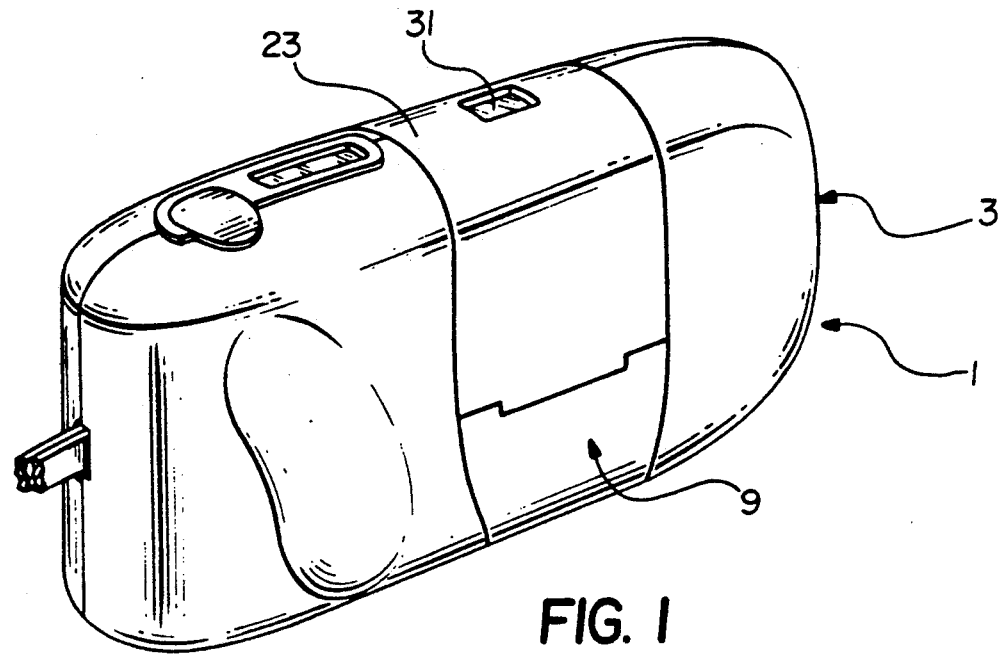
FIG. 1 is a front perspective view of a compact camera with a flip-up flash unit according to a preferred embodiment of the invention, showing the flash unit in a folded storage position.
Figure 2:
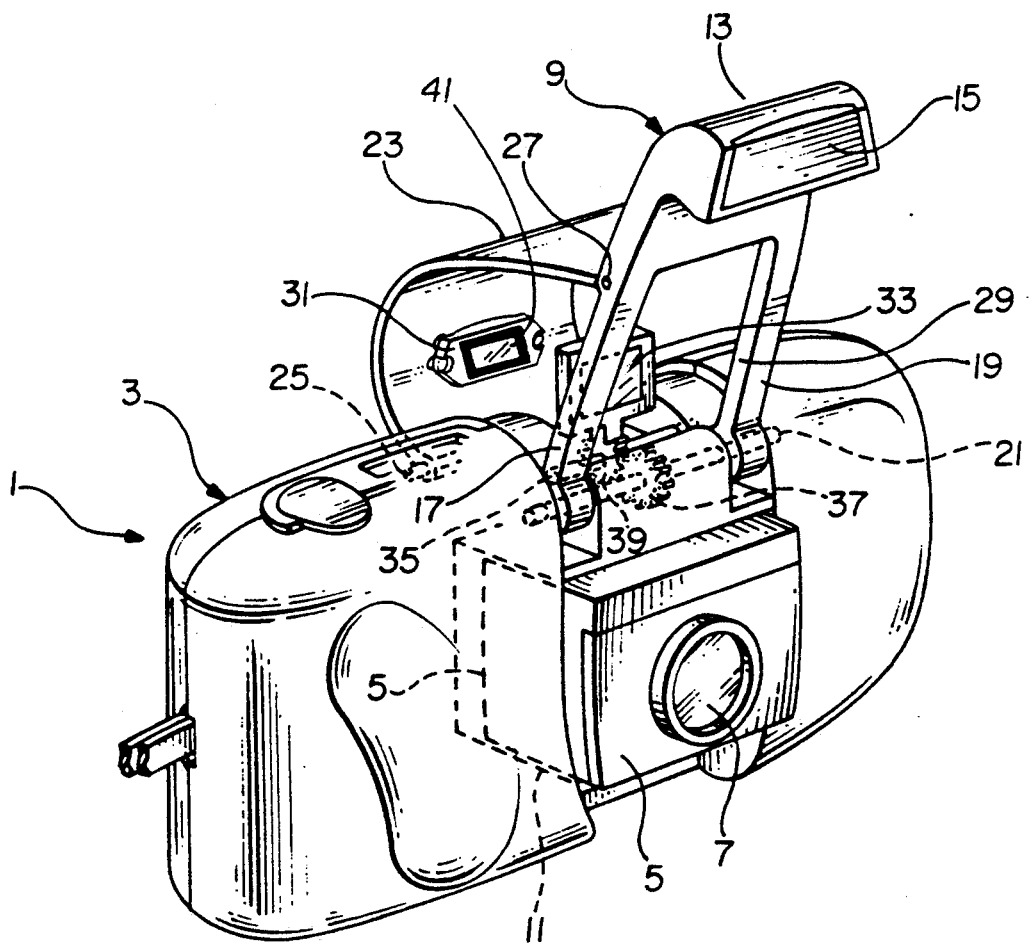
FIG. 2 is a front perspective view similar to FIG. 1, showing the flash unit in a non-folded use position.

Referring now to the drawings, FIGS. 1 and 2 show a compact 35 mm camera 1 comprising a contoured camera body 3, a lens carrier 5 for an objective (taking) lens 7 and a flip-up flash unit 9.

The lens carrier 5 is supported in a light-tight channel 11 in the camera body 3 for translation outwardly and inwardly of the camera body, along the lens's optical axis (not shown), between an extended picture-taking position shown in FIGS. 2 and 5 and a retracted storage position shown in FIG. 3. A compression spring (not shown) urges the lens carrier 5 to its picture-taking position, and known stops (not shown) prevent translation of the lens carrier outwardly beyond that position. Alternatively, the lens carrier 5 can be supported for movement between its picture-taking and storage position as shown in U.S. Pat. No. 4,557,571.

The flash unit 9 includes a flash emission window 15 and a pair of spaced rigid legs 17 and 19. The rigid legs 17 and 19 are pivotally connected to the camera body 3 by means of a coaxial pin 21 to support the flash unit 9 for manual swinging movement about the coaxial pin between a folded storage position in front of the objective lens 7 when the lens carrier 5 is in its storage position shown in FIG. 3 and a non-folded use position elevated from the camera body when the lens carrier is in its picture-taking position shown in FIGS. 2 and 5. As the flash unit 9 is manually flipped down from its use position to its storage position, the rigid legs 17 and 19 move against the lens carrier 5 to push the lens carrier further into the channel from its picture-taking position to its storage position. See FIGS. 3–5.

A separate thin support or cover part 23 is pivotally connected to the camera body 3 by means of an axial pin 25 and is pivotally connected to the rigid legs 17 by respective coaxial pins 27. This connection causes the support part 23 to act as a rear support or brace for the flash unit 9 when the flash unit is in its use position shown in FIGS. 2 and 5 and to act as a lid or cover for an open space 29 between the rigid legs 17 and 19 when the flash unit is in its storage position shown in FIGS. 1 and 3. The supporting part 23 is resiliently flexible, i.e. spring-like, and since it is constrained at opposite ends by the axial pin 25 and the coaxial pins 27, it will be flexed along its length in opposite directions when the flash unit 9 is flipped up and down. Consequently, the supporting part 23 will operate as an overcenter spring to urge the flash unit 9 alternatively to the storage and use positions when it is flexed beyond an overcenter, i.e. mid, position (not shown).

The open space 29 between the rigid legs 17 and 19 of the flash unit 9 is located to act as a viewfinder opening for viewing a subject to be photographed when the flash unit is in its use position shown in FIGS. 2 and 5. To enhance the view of the subject, the supporting part 23 includes a finder eye-lens 31. In addition, a finder front-lens 33 is pivotally connected to the camera body 3 by means of an axial pin 35 to support the finder front-lens for swinging movement about the axial pin between a collapsed folded position shown in FIG. 3 and an erect viewing position shown in FIGS. 2 and 5. Respective gears 37 and 39 fixed to the axial pins 21 and 35 for the flash unit 9 and the finder front-lens 33 continuously engage to swing the finder front-lens from its folded position to its viewing position responsive to flipping up the flash unit 9 from its storage position to its use position. See FIGS. 3-5. Conversely, the gears 37 and 39 swing the finder front lens 33 from its viewing position to its folded position responsive to flipping down the flash unit from its use position to its storage position. When the flash unit 9 is in its use position shown in FIGS. 2 and 5, the finder front-lens 33 is located between the open space 29 and the finder eye-lens 31 in optical alignment with the open space and the eye-lens. Thus, one views a subject by looking through the finder eye-lens 33, the finder front-lens 31, and the open space 29.

Figure 6:
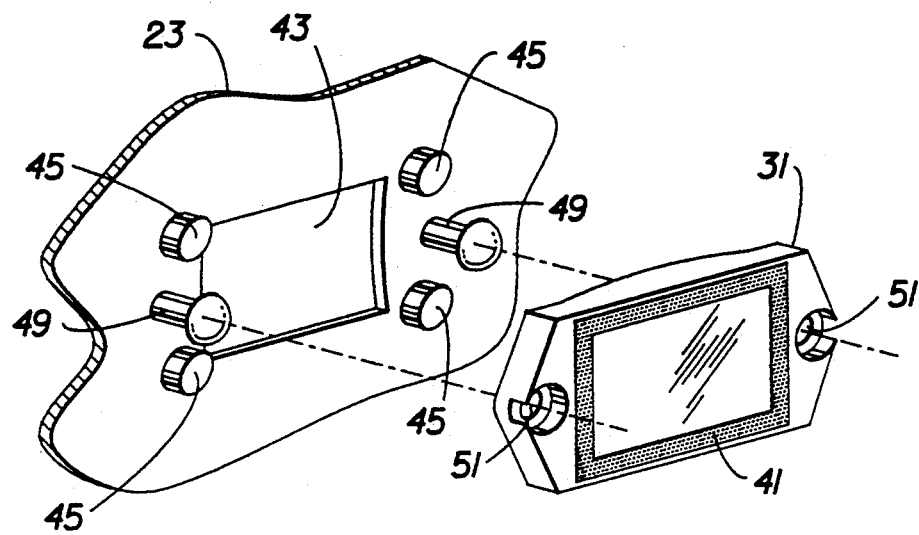
FIG. 6 is an exploded perspective view of a viewfinder lens mount for the compact camera.
Figure 7:
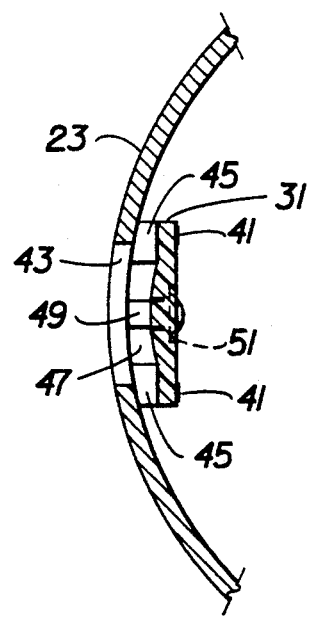
FIG. 7 is a side elevation section view of the viewfinder lens mount.

The finder eye-lens 31 as is typical is non-flexible and has a viewfinder frame 41 painted on it. The supporting part 23 has a viewfinder opening 43 with four spacer pads 45 arranged proximate the respective corners of the viewfinder opening to support the finder eye-lens 31 over the viewfinder opening as shown in FIGS. 6 and 7. Consequently, an open space 47 exists between the supporting part 23 and the finder eye-lens 31. See FIG. 7. A pair of identical pins 49 project from the supporting part 23 into respective countersunk holes 51 in the finder eye-lens 31 to hold the eye-lens fast on the four spacer pads 45. The two pins 49 are spaced apart laterally across the supporting part 23 as opposed to being spaced apart longitudinally along the supporting part. This design prevents the finder eye-lens 31 from obstructing or interfering with flexing of the supporting part 23 when the flash unit 9 is flipped up or down.

The invention has been described with reference to a preferred embodiment. However, it will be appreciated that various modifications can be effected within the ordinary skill in the art without departing from the scope of the invention.

I claim:

1. A compact camera comprising a flash unit adapted to be flipped up from a camera body for use and flipped down towards said camera body for storage and having a viewfinder opening for viewing a subject to be photographed, and an elongate resiliently flexible supporting part for said flash unit constrained to be flexed longitudinally in opposite directions when the flash unit is flipped up and down to operate as an overcenter spring for urging the flash unit alternatively to flip up or down and having a viewfinder opening arranged to be located behind said viewfinder opening of the flash unit when the flash unit is flipped up, is characterized by:

a non-flexible viewfinder lens element; and securement means connecting said non-flexible lens element to said flexible supporting part over its viewfinder opening but only at in-line points spaced apart laterally across the supporting part, as opposed to longitudinally along the supporting part, to prevent the lens element from interfering with flexing of the supporting part longitudinally.

2. A compact camera as recited in claim 1, wherein spacer means is located between said non-flexible lens element and said flexible supporting part for providing an open space that separates the lens element and the supporting part.

* * * * *